US005534975A

United States Patent [19]
Stefik et al.

[11] Patent Number: 5,534,975
[45] Date of Patent: Jul. 9, 1996

[54] DOCUMENT PROCESSING SYSTEM UTILIZING DOCUMENT SERVICE CARDS TO PROVIDE DOCUMENT PROCESSING SERVICES

[75] Inventors: Mark J. Stefik, Woodside; Daniel M. Russell; Daniel G. Bobrow, both of Palo Alto; D. Austin Henderson, Jr., La Honda, all of Calif.

[73] Assignee: Xerox Corporation, Stamford, Conn.

[21] Appl. No.: 451,937

[22] Filed: May 26, 1995

[51] Int. Cl.$^6$ ................................................. G03G 21/00
[52] U.S. Cl. ........................ 355/202; 355/200; 355/208; 355/308
[58] Field of Search ................................ 355/200, 202, 355/204, 208, 210, 308, 313, 314; 364/188, 525; 395/101; 235/454

[56] References Cited

U.S. PATENT DOCUMENTS

| | | | |
|---|---|---|---|
| 4,248,528 | 2/1981 | Sahay | 355/308 |
| 4,310,235 | 1/1982 | Lorenzo et al. | 355/314 |
| 4,711,560 | 12/1987 | Hosaka et al. | 355/200 |
| 4,728,984 | 3/1988 | Daniele | 358/300 |
| 4,757,348 | 7/1988 | Rourke et al. | 364/525 |
| 5,224,207 | 6/1993 | Filion et al. | 395/101 |
| 5,442,541 | 8/1995 | Hube et al. | 364/188 X |
| 5,459,307 | 10/1995 | Klotz, Jr. | 235/454 |
| 5,485,245 | 1/1996 | Kobayashi et al. | 355/202 |

*Primary Examiner*—Sandra L. Brase
*Attorney, Agent, or Firm*—Richard B. Domingo

[57] ABSTRACT

A user extensible document processing system. The extensible document processing system includes a document processing platform such as a digital copier, control forms for specifying requested services and instructions and one or more document service cards. User provided document processing services are contained on document service cards. A set of basic document processing services are provided by the document processing platform. The document processing platform includes one or more ports for coupling to document service cards, a registration device for registering services into a service taxonomy, a deregistration device for deregistering services from the service taxonomy, a service dispatcher for identifying the service to process a control form using the service taxonomy, and a scanner for creating a digital representation of a paper based document. The document processing platform registers document services upon detecting the coupling of a document services card.

23 Claims, 9 Drawing Sheets

DOCUMENT PROCESSING SYSTEM UTILIZING DOCUMENT SERVICE CARDS TO PROVIDE DOCUMENT PROCESSING SERVICES

FIELD OF THE INVENTION

The present invention is related to the field of document processing systems, and in particular to mechanisms for adding and removing document processing services to a document processing system.

BACKGROUND OF THE INVENTION

Copiers now provide for more than simple duplication of a document. Copiers are used to reduce or enlarge documents, print on transparency media, staple copies and the like. Also with the advent of digital copiers, the function of the copier can be extended to that of any image processing system.

In the prior art, it is also known to be able to enter and store copying information in a reproduction machine. For example, U.S. Pat. No. 4,711,556 discloses a copying machine that allows for inputting copying instructions, means for temporary storage of these instructions, a display of these values, an interrupt mode that will let the operator input different copying instructions, a readout of the new instructions, and a means to return to the original mode settings once the interrupt is completed.

The prior art discloses various systems which allow the control of a copying machine via a transportable storage mediums. For example, the Xerox 5700 Electronic Printing System accepts magnetic cards, cassettes, and disks that store the documents to be printed and also the magnetic media can store control information to specify the output format for printing to invoke special features such as merging or interleaving. The system software translates the coded data, formats the page, and generates the hard copy locally, or the system can transmit the data via a communication link to remote 5700 printing sites.

U.S. Pat. No. 4,711,560 discloses a copier which functions according to a sequence control program stored on a floppy disk and loaded by a user. The floppy disk can also contain a diagnostic program to facilitate maintenance, and further act as a key to prevent unauthorized use of the copier.

U.S. Pat. No. 4,742,483 discloses a laser printer including a microprocessor to read data or program information from a cartridge loaded by a user. A special maintenance operating system on the cartridge runs the printer through automatic routines to be checked by a technician.

U.S. Pat. No. 4,248,528 discloses a control system in which preprinted and operator marked control sheets are fed past an optical scanner connected to the control system and the documents are copied according to the instructions on the control sheets.

U.S. Pat. No. 4,453,821 discloses a technique to configure a copier prior to a production run including a programmable, nonvolatile memory for storing information corresponding to at least two different setup configurations and a mechanism for selecting one of these configurations and configuring the copier in accordance with the selected configuration.

U.S. Pat. No. 4,310,235 discloses an operator console, a card reader, and a control for feeding preprogramming marked cards to the card reader for storing the programming information into RAM memory. A job stream feature permits the operator to place a plurality of different jobs into the machine for automatic production and a job exception feature allows the machine to be automatically conditioned to deviate from the normal reproduction run. Features can also be programmed at the operator console, but the console inputs are inhibited once the programmed card has been inserted.

U.S. Pat. No. 5,224,207 is concerned with a technique for preprogramming a reproduction machine for a plurality of complex jobs involving a variety of machine features and requirements at a computer console remote from the reproduction machine operator console and touch sensitive screen display. In particular, a remote computer console compatible with the reproduction machine control, manifests a simulation of a plurality of preprogramming slots and machine features for each slot that simulate a plurality of features and subfeatures of job requirements for the machine. The plurality of selected features for each preprogrammed job slot are automatically stored in the selected preprogramming slots on a removable media such as a floppy disk. The floppy disk can be inserted into the reproduction machine to automatically preprogram the machine for a plurality of discrete job runs without any additional operator initiative.

A drawback of the prior systems is that the features contained therein are fixed and not easily extensible for support of unique document processing requirements. For example, the requirements of a law office for a document processing system would be different then those in a medical office. Moreover, it is often the case that entirely new document processing systems must be created in order to provide support for new function. Thus, it would be desirable to provide a document processing system that is inherently extensible.

It would further be desirable to provide a means to add and remove document processing services in a realtime or dynamic fashion, e.g. in a plug and play mode of operation.

SUMMARY OF THE INVENTION

An extensible document processing system which permits a user to add document processing services is disclosed. The extensible document processing system is comprised of a document processing platform, such as a digital copier, that is capable of coupling with one or more document service cards. Document processing services and instructions are contained on the document service cards. The document processing platform is further comprised of a scanner for creating a digital representation of a paper based document, a marking means for creating marks on a medium representing the processed and reproduced document; and various means providing various classes of basic document processing services.

In the present invention, document processing services are organized into a hierarchical service taxonomy. The service taxonomy is comprised of predefined service classes. Each service class explicitly defines one or more instructions and implicitly inherits any instructions of "parent" service classes. It is through the specification of an instruction that a document processing function is performed. A representation of the service taxonomy is stored in the document processing platform. Document processing services which may be utilized by the document processing system are marked as available in the service taxonomy. At a minimum, the basic classes of document processing services are marked as available. When a document service card is coupled to the document processing system, the document services contained therein are marked as available in the service taxonomy. Likewise, when a document service card is removed, the associated document processing services become marked as unavailable in the service taxonomy.

Invocation of document processing instructions is through the use of control forms. Document processing service classes and instructions are encoded on control forms and are inserted into a document processing stream. The document processing platform detects the presence of such a form, extracts the specified document processing class and instruction, and causes the appropriate document processing instruction to be performed.

The present invention is advantageous in that it provides a convenient way for users to add services to a document processing platform for particular uses. The present invention further provides an alternative way to provide document processing platforms, namely as a system with basic functionality to which desired services may be easily added. Other advantages and features of the present invention will become apparent in the description of the preferred embodiment below.

DETAILED DESCRIPTION OF THE CURRENTLY PREFERRED EMBODIMENTS

An extensible document processing system is disclosed. In the following description numerous specific details are set forth, such as the Personal Computer Memory Card International Association (PCMCIA) standards, in order to provide a thorough understanding of the present invention. It would be apparent, however, to one skilled in the art to practice the invention without such specific details. In other instances, specific implementation details, such as the representation of a scanned image page, have not been shown in detail in order not to unnecessarily obscure the present invention.

In the foregoing description the term "services" will refer generally to functions or features available from a document processing platform. The term "basic services" refers to the services inherently provided by a document processing platform. The term "added services" will refer to services provided through a document service card. Note that the "added services" need not provide new functionality, but may merely be better ways of providing existing functionality.

The currently preferred embodiment of the present invention may be used in a manner described as follows. A user having special document processing requirements acquires services embodied on a document service card. The user "installs" the services on the document processing platform by inserting the document service card into a slot defined by the document processing platform. To invoke the features, the user includes with the document processing stream one or more control forms containing the desired document processing instructions. Use of control forms to control operation of the document processing platform is termed a page user interface. The document processing platform recognizes the control form and invokes the appropriate services. The services remain accessible to the document processing platform until the document service card is removed.

The services of the present invention include various instructions associated with the service. For example, a service called "Encryption Services" would have a first instruction called "encrypt" and a second instruction called "decrypt". To use "Encryption Services", the class "Encryption Services" is specified along with the desired instruction. Services are further organized into inheritance classes. Each inheritance class "inherits" the instructions associated with it's superclasses (i.e. its parent classes). So for example, any service class to which "Encryption Services" is a super class, would inherit (i.e. include) the instructions "encrypt" and "decrypt". An instance of a service would thus be comprised of a particular service class and all of it's superclasses.

Overview Of A Document Processing System of The Currently Preferred Embodiment

Figure 1:
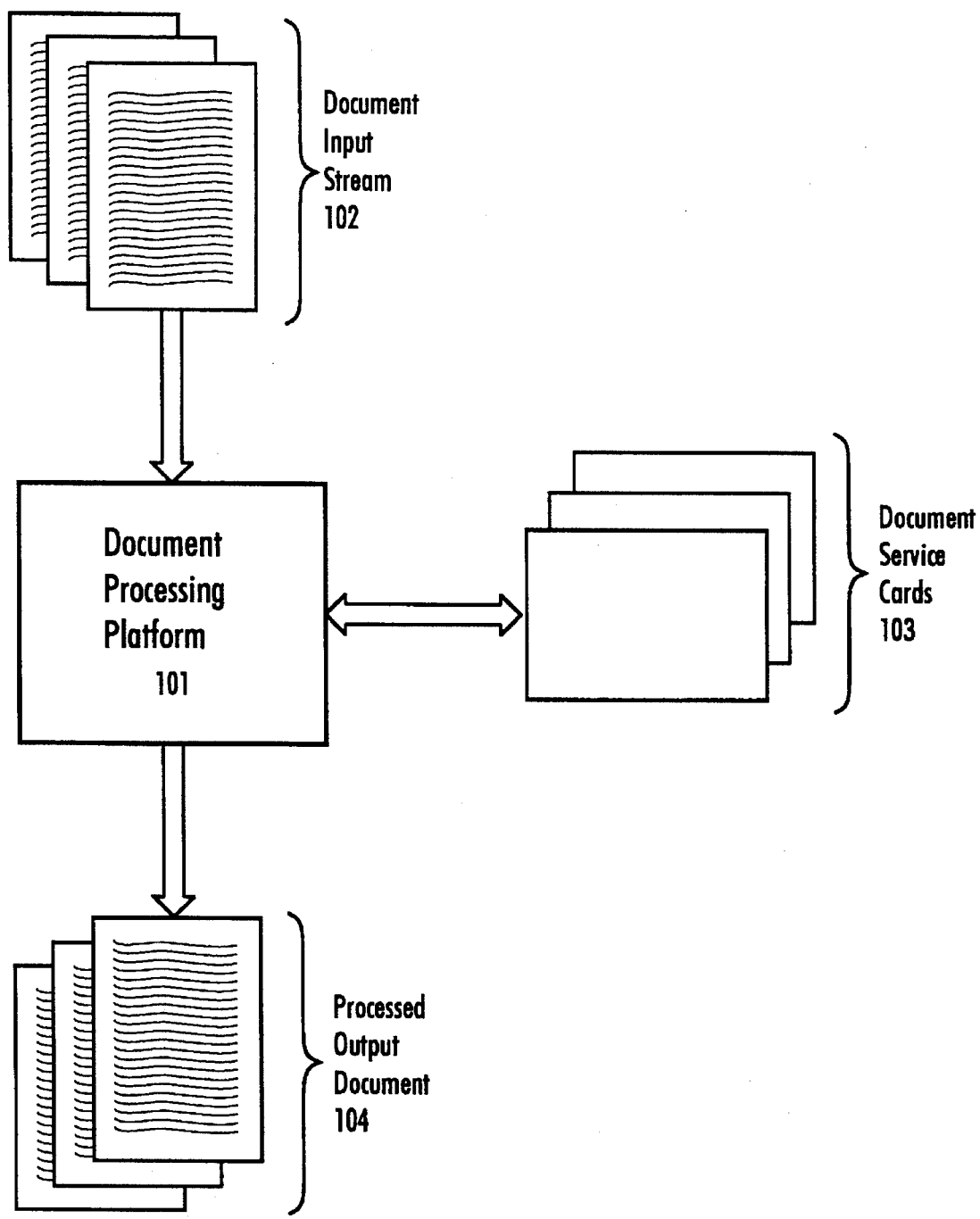
FIG. 1 is a block diagram of a document processing system in the currently preferred embodiment of the present invention.

FIG. 1 is a diagram illustrating the document processing system of the currently preferred embodiment. Referring to FIG. 1, a document processing platform 101 provides a means to receive a document input stream 102. The document input stream 102 will have contained therein the pages of the document to be processed and one or more control forms which specify document processing service classes and instructions. In the currently preferred embodiment, the document processing platform is a digital copier. Preferably, the control forms encode the service class and instruction using a machine readable optical coding scheme as described in U.S. Pat. No. 5,169,147 entitled "Self-Clocking Embedded Digital Data", which is assigned to the assignee of the present invention. Other embedded, optically encoded data technology could be utilized, e.g. bar codes, without departing from the spirit and scope of the present invention.

The document processing platform 101 further provides means to couple to one or more document service cards 103. The document service cards 103 contain the various document services that will be accessible by the document processing platform 101. The document services may be in the form of coded instructions executed on the document service card and that are accessible by the document processing platform. A document services card may even contain special purpose document processing hardware. Finally, the document processing platform 101 provides means for generating a processed output document 104 responsive to the input of the document stream 102.

Figure 2:
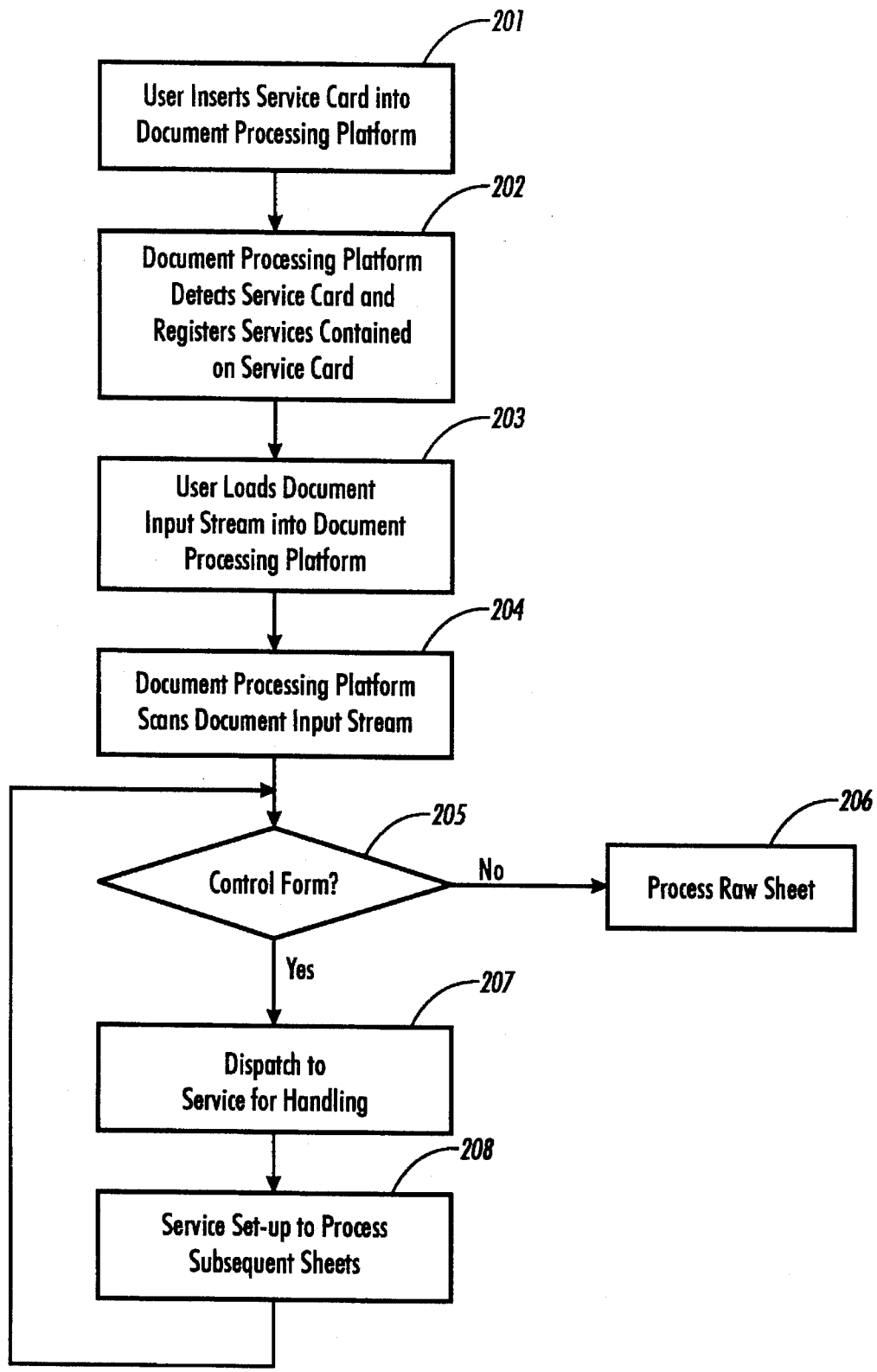
FIG. 2 is a flowchart illustrating the basic operational steps of the document processing system in the currently preferred embodiment of the present invention.

FIG. 2 is a flowchart describing the basic operational steps of the currently preferred embodiment of the present invention. Referring to FIG. 2, a user inserts a service card into the document processing platform, step 201. The document processing platform detects this, typically by the establishment of an electrical connection, and registers the services contained on the service card as available on the document processing platform, step 202. At this point, additional functionality has been added to the document processing platform. A user will then load a document input stream, e.g. a stack of paper comprised of control forms and the document to be processed, into the document processing platform, step 203. The document processing platform will then scan pages of the document input stream, step 204. The document processing platform will examine each scanned page to determine if it is a control form, step 205. Control forms will have a control form indicator at a predetermined location on a page. If the scanned page is not a control form, the scanned page is processed according to the then current processing configuration of the document processing platform, step 206. As will become apparent from the description below, the processing configuration will change when document processing services are invoked. In any event, if a scanned page is a control form, the document processing platform dispatches the control form to the service class specified on the control form for handling, step 207. As will be described below, the control form will contain at a predetermined location a service class indicator which contains an identifier for the service class in an encoded form. Finally, the service class will invoke an instruction specified in the control form which will process subsequent document pages in the document input stream, step 208. The processing of steps 205–208 is repeated for the each of the scanned image pages in the document input stream.

Each of the various functional components of the present invention are now described in greater detail.

Document Processing Platform

In the currently preferred embodiment, the document processing platform is a digital copier. However, it would be apparent to one skilled in the art to implement the present invention in other types of systems which create digital representations of paper mediums such as facsimile devices.

Figure 3:
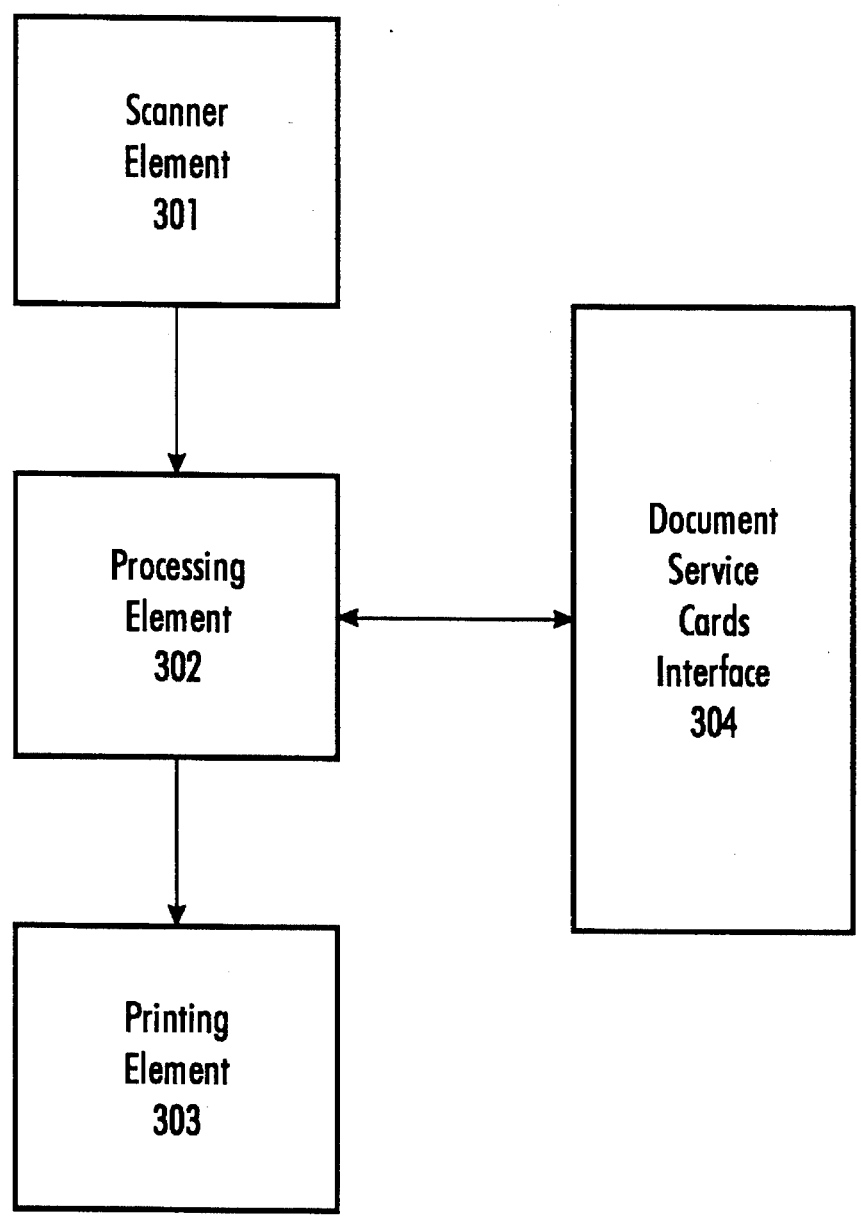
FIG. 3 is a block diagram of the basic elements of a document processing platform of the currently preferred embodiment of the present invention.

FIG. 3 is a block diagram of the functional elements of a document processing platform in the currently preferred embodiment. Referring to FIG. 3, a scanner element 301 is used to create a bit-mapped representation of a medium (termed the scanned image). Scanning techniques for creating a bit-mapped representation of an image are well known, so no further description of the operation of the scanner 301 is deemed necessary. Once created, the scanned image is transmitted to a processing element 302. The processing element 302 will perform various functions in processing the scanned image such as identification of control forms and service dispatch. The processing element 302 is described in greater detail below.

Once the scanned image is ready to be printed out, it is transmitted to printing element 303. The processing element 302 will also provide the printing element 303 with any instructions, calibration data or other information needed for document reproduction.

Finally, a document service cards interface 304 is illustrated. The document processing platform and document service card will communicate according to a service card protocol 305 (described in greater detail below). Moreover, in the currently preferred embodiment, the document services cards interface 304 supports devices that comply with the PCMCIA standards. The PCMCIA has defined an open standard for personal computer cards intended for use with portable computer systems, but which can be used with any computer based system. PCMCIA cards are desirable because of their small size and support for plug and play applications (which means that the computer system will automatically recognize insertion of a card in a slot and allocate the appropriate system resources). Utilization of such plug and play applications does require Basic Input/Output System (BIOS) and operating system level software coding. Specifications for designing products for support of PCMCIA cards and creating the requisite BIOS and operating system level software is available from the PCMCIA Headquarters, located in Sunnyvale Calif. In any event, the plug and play operation enables the automatic registration of services contained on the document service cards onto the document processing platform.

Figure 4:
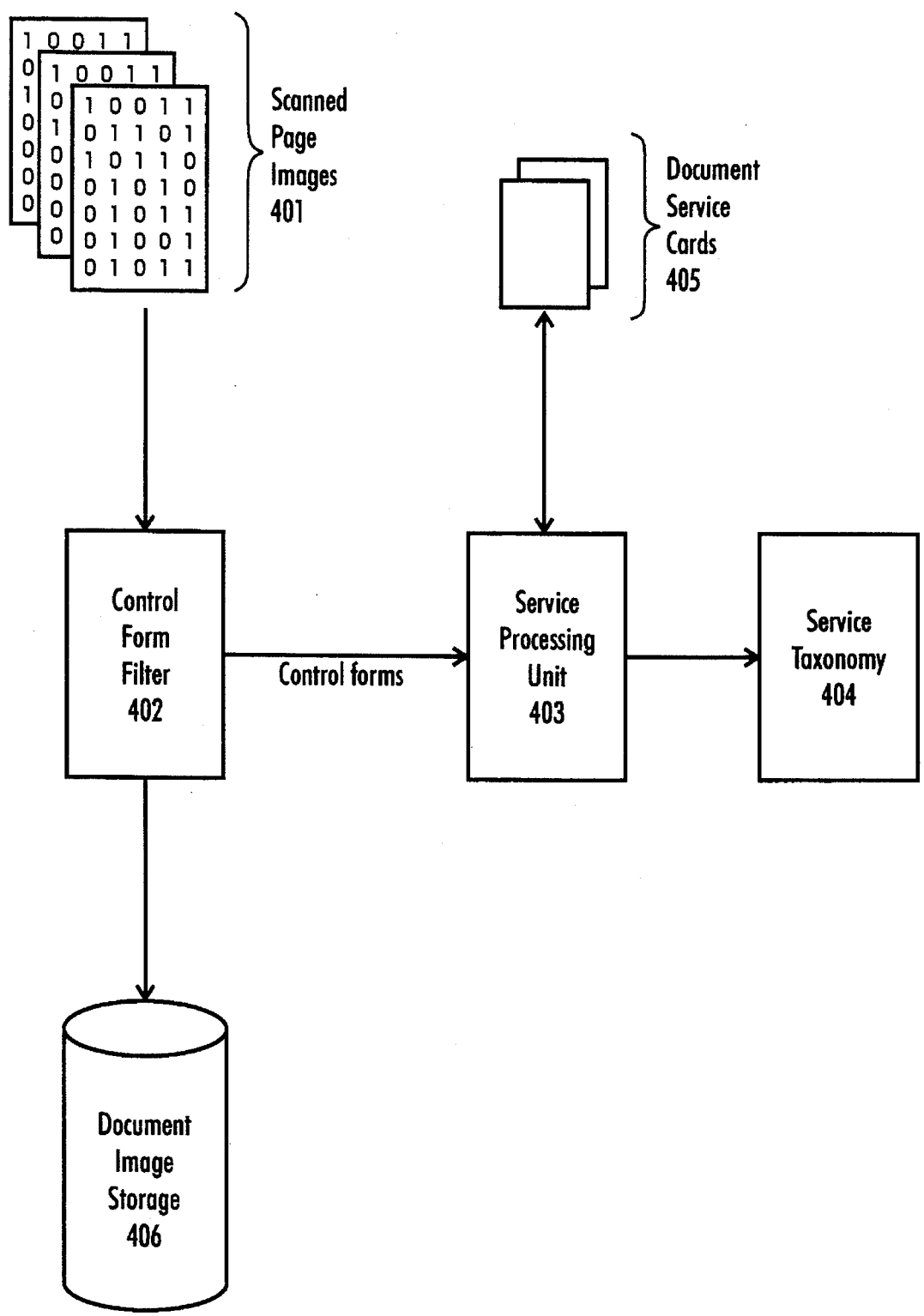
FIG. 4 is a block diagram of the basic functional units of a processing element as illustrated in FIG. 2, as may be utilized in the currently preferred embodiment of the present invention.

FIG. 4 illustrates the processing element 302 in greater detail. The scanned image 401 (e.g. pixel values) from the scanner element 301 are received by a control form filter 402. The control form filter 402 examines the scanned image to determine if it is a control form. Control forms are typically identified by a predetermined optically encoded pattern that is located at a predetermined location of the scanned image. Upon the identification of a control form, the filter 402 transmits the control form to service processing unit 403. If the scanned image is not a control form, the scanned image is stored in a document image storage 406. Further illustrated in FIG. 4 are service taxonomy 404 and the document service cards 405.

Figure 5:
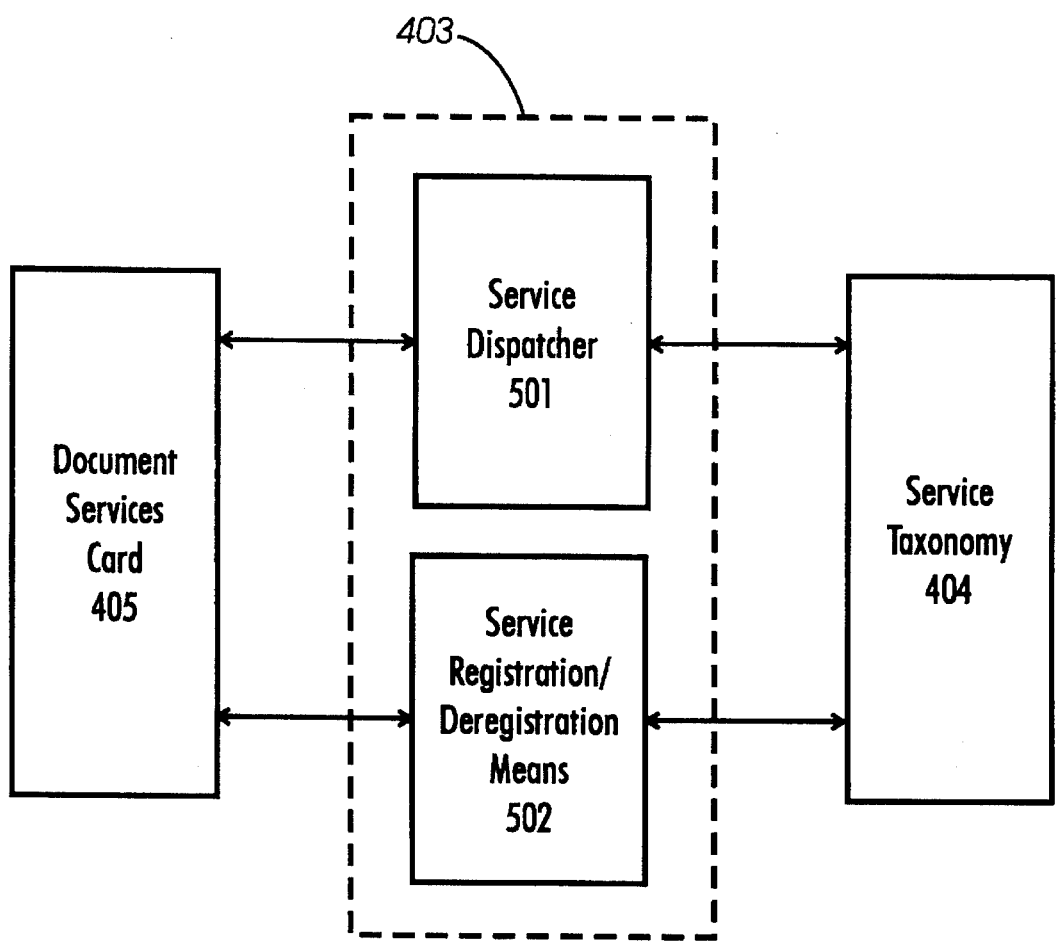
FIG. 5 is a block diagram of the basic functional units of a service processing unit as illustrated in FIG. 4, as may be utilized in the currently preferred embodiment of the present invention.

The service processing unit 403 is illustrated in greater detail in FIG. 5. Upon detection of a control form, a service dispatcher 501 checks the service taxonomy 404 and dispatches the form to either the service specified in the control form or to a default service. Having a default service in the absence of the specified service enables the document processing stream to be processed even though the specified service is not available. This eliminates the need to create a new control form particular to the document processing system being used. The service processing unit 402 further comprises a service registration/deregistration means 502 for registering and deregistering services from document service cards 405, to/from the service taxonomy 404. The service taxonomy 404 is a logical structure of document processing service classes and instruction which are organized by service class. When a service is registered, it is marked as available and when a service is deregistered it becomes marked as unavailable.

The transmittal of a control form will cause the service processing unit to enter into a particular document processing configuration. The document processing platform will remain in the document processing configuration until another control form is received which cancels a previous instruction or which specifies a new service.

Service Dispatcher

The service dispatcher determines which service interprets each control form. Services are assigned both identities and classes. Class information is used by the dispatcher to select which of the registered services should carry out each instruction. It is noted that the dispatching process as described herein is roughly analogous to precedence-determination among superclasses in object-oriented languages. Such precedence-determination is used in deciding which superclasses method to employ when an instance object receives a message. The services dispatcher uses the taxonomy of services to determine which service should interpret each control form. Each service is able to interpret the parameters encoded on its own control sheets and to invoke the required actions.

The service dispatcher of the present invention is class based. A control form has a class identifier, an instruction and optional parameters for carrying out the instruction. Further, some forms may have service identifiers indicating that they should only be carried out by the service named.

The classes ("types") of services are organized in the service taxonomy. The service taxonomy assures that the precedence relationship between any two service classes is well defined. When an instruction is received, a service is requested to handle the instruction. The service selected depends on a class-precedence list which is computed from the taxonomy of superclasses of the instruction.

The identifier of the relevant service is a property of the control form specifying the operation. Thus, the instructions encoded in the control forms carry information about service selection.

It should be noted that in the currently preferred embodiment, the service taxonomy is a static structure which is periodically distributed to the various document processing platforms. A consensus is reached concerning the content and precedence procedure of the classes by some governing body. This consensus is then used to create the service taxonomy.

Figure 6:
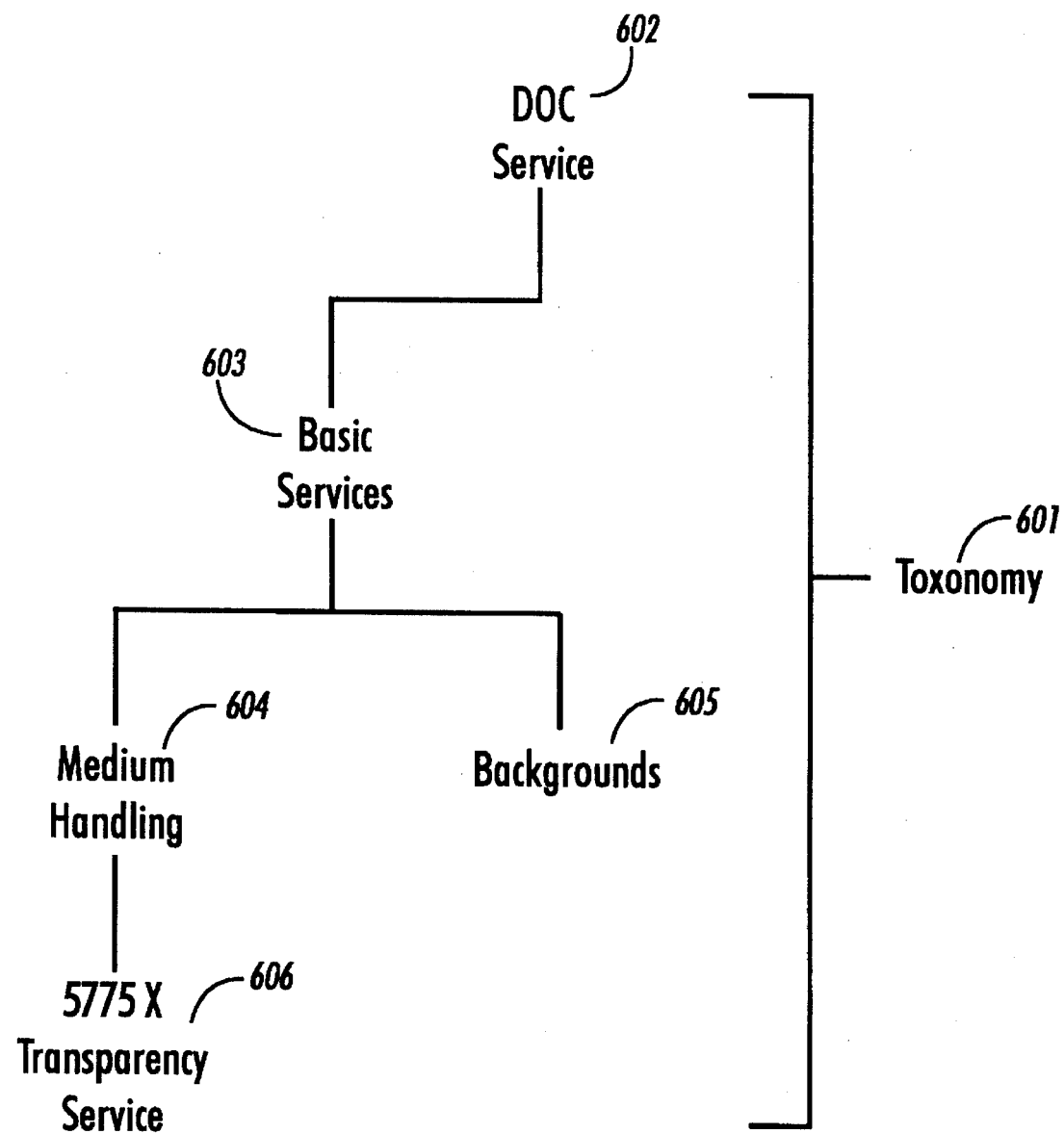
FIG. 6 is a logical view in tree form of a service taxonomy as may be utilized in the currently preferred embodiment of the present invention.

FIG. 6 illustrates an example of a class based service taxonomy of the currently preferred embodiment. Referring to FIG. 6, the service taxonomy 601 is illustrated as a tree structure. Top node 602 "Doc Service" is the root node in the taxonomy. The top node 602 will typically not contain any instructions. Node 603 labeled "Basic Services" represents a class of basic services that are provided with a document processing platform. Node 604 labeled "Medium Handling" and Node 605 labeled "Backgrounds" represent two particular kinds of service classes. Finally, the node 606 labeled "5775X Transparency Service" represents a more specialized service class.

The node representation of a node in the service taxonomy has two primary indicators; an indicator that the corresponding service is "available" and a pointer to where the service resides (typically a document service card, but the service may even reside somewhere on a network). In the case of extended services on a document service card, the service becomes available when the document service card is coupled to the document processing platform.

Figure 7:
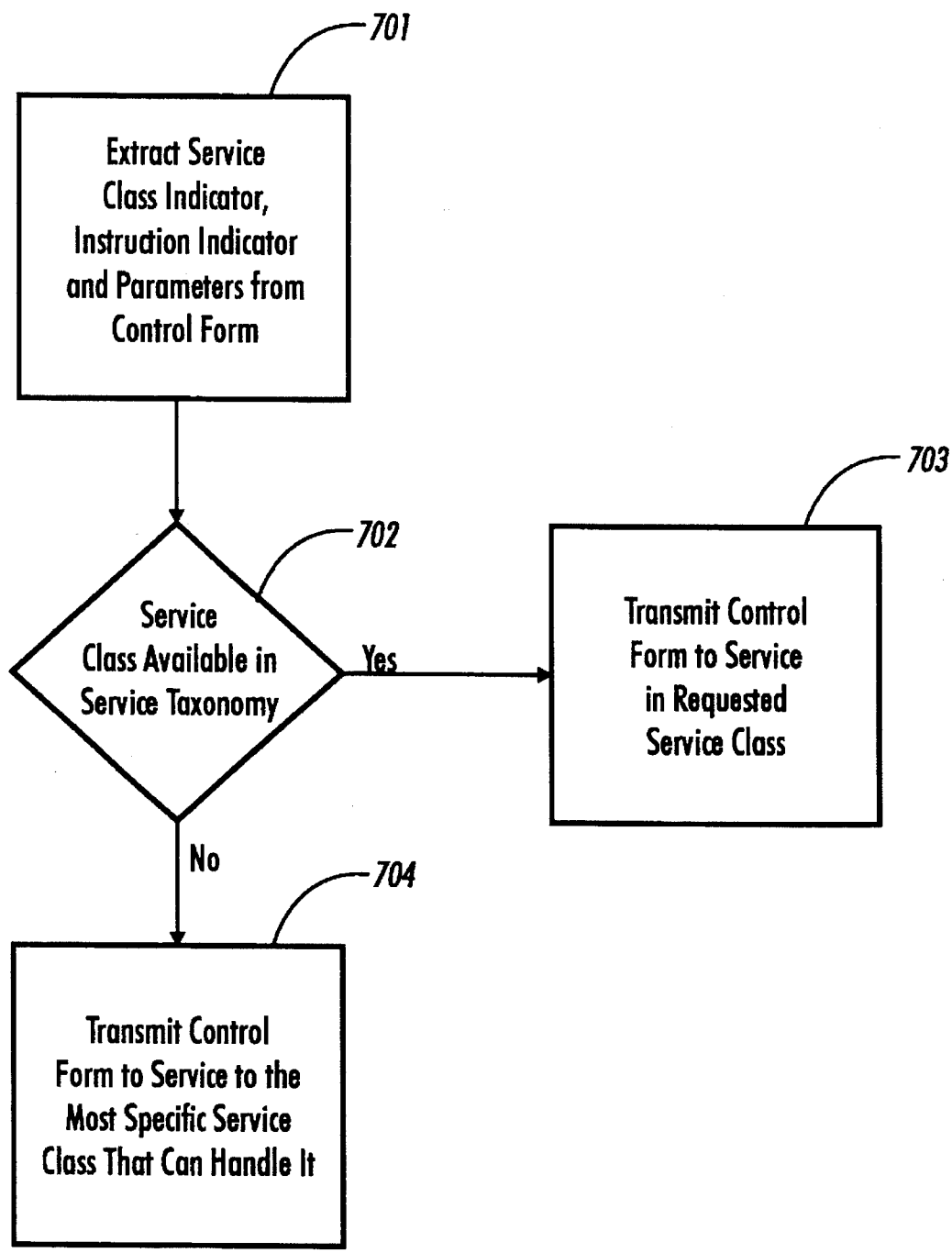
FIG. 7 is a flowchart illustrating the basic steps for identifying a service class to process a control form in the currently preferred embodiment of the present invention.

An important function of the dispatcher is to identify control forms and to dispatch the specified service class. FIG. 7 is a flowchart describing the steps of service class dispatchment. Referring to FIG. 7, the Dispatcher first extracts a service class identifier to determine the class of the relevant services, step 701. The dispatcher then checks the service taxonomy to determine if the requested service class is available, step 702. If the service class is available, the control form is transmitted to the service in the requested service class, step 703. If the requested service class is not available, the control form is transmitted to the service in the most specific service class that can handle it for processing, step 704. The alternate/default service class is typically a superclass of the requested service class.

When one document processing platform is busy, users will occasionally need to process their documents on a substitute platform with possibly downgraded capabilities. When a user does this, they will not want to go through their document input stream to remove or alter the control forms. They will want to be able to tell the substitute document processing platform to do reasonable things, flushing some commands and doing substitute operations for others.

As described above, the class-based dispatcher can accommodate this by taking various default actions when instructions are requested for which there is no relevant service. Defaults could be specified by the platform or by generic Basic services. For example, Basic services could provide various defaults for uncaught service—logging them in a job report but flushing them from the document processing job in most cases.

It should be noted that it would be possible to provide Dispatcher control sheets that modify the operation of the dispatcher itself. These control sheets would specify how to handle missing services (or "uncaught instructions") or could be used to temporarily specify a substitution of services for the duration of a job. This idea is analogous to approaches used in meta-object protocols from the object-oriented programming.

Document Service Cards

Document Service Cards are the means by which added services are provided to the document processing platform. The document service cards also contain documentation regarding the services and sample control forms for enabling the added services. The documentation and control forms can be printed through requests from the document processing platform.

Figure 8:
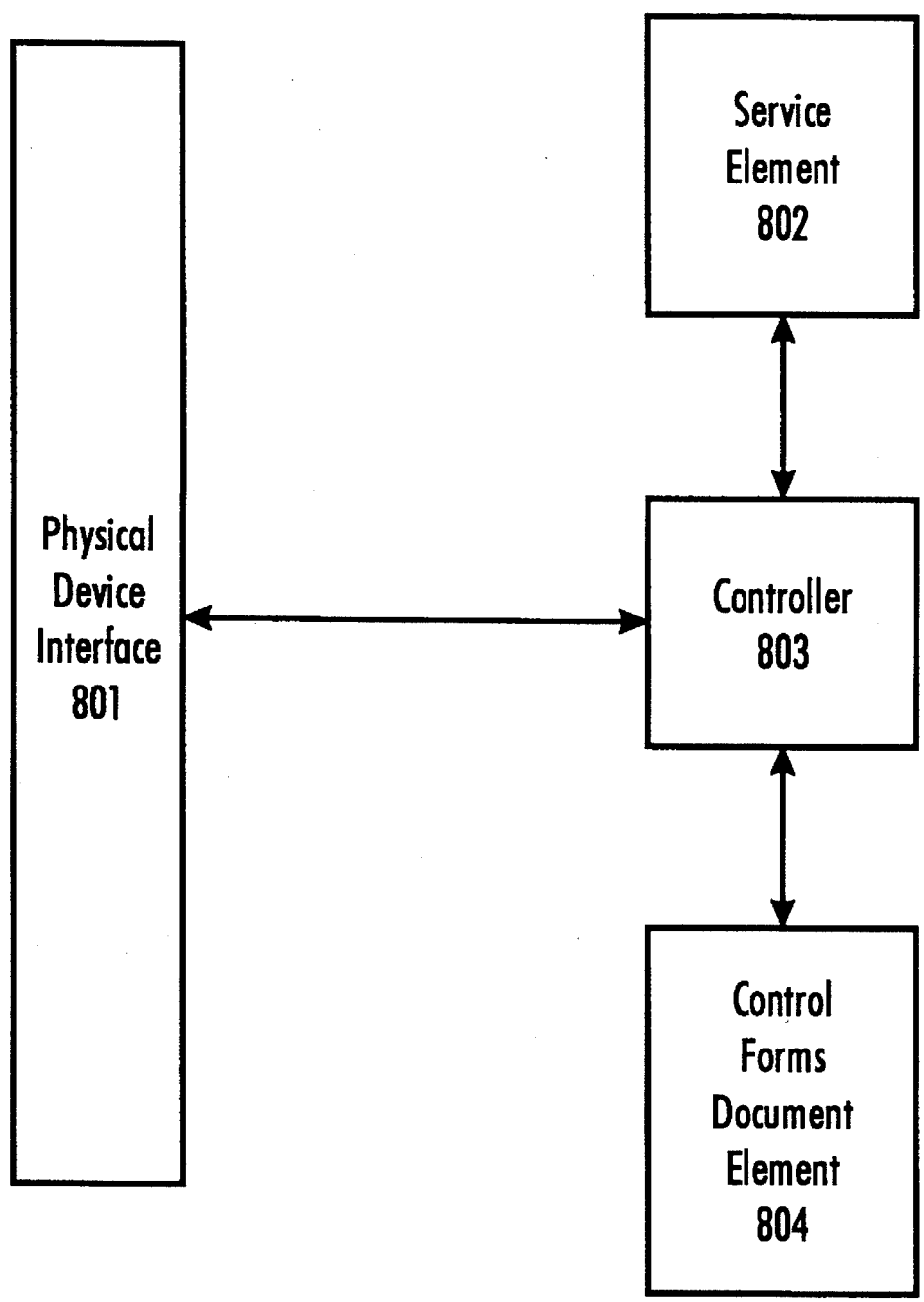
FIG. 8 is a block diagram of a document service card as may be utilized in the currently preferred embodiment of the present invention.

FIG. 8 illustrates the functional components for a document service card. Referring to FIG. 8, the card couples to the document processing platform via physical device interface 801. The physical device interface 801 will typically be a set of signal connectors arranged in some standardized fashion. In the currently preferred embodiment, the physical device interface 801 is arranged according to the PCMCIA standards. In any event, the signals received are interpreted by a controller 803. The controller 803 is used to respond to registrations requests or to requests for documentation or control forms.

The control forms/documentation element 804 will typically be some form of storage. The control forms and documentation are preferably stored in an image format so that they may be readily printed out on the document processing platform.

The service element 802 may take on various forms, depending on the nature of the added services. In some instances, the service element 802 is comprised of Read Only storage (holding computer program codes). In this case the services would be either coded instructions that could be executed by the document processing platform or it could be calibration data that will allow more effective use of scanner or printing elements of the document processing platform, or it could be set-up data for the document processing platform, or it could be a pointer to a network location where the service resides. In other instances, the service element 802 is comprised of circuitry for performing various document processing functions itself. For example, a particular way of doing automatic image enhancement requiring specialized circuitry. This would be a natural way of extending the function of a document processing platform.

Finally, the document service card may include means for performing fee reporting for use of the services contained on the document service card. It is anticipated that most users of a service would prefer to be billed based on use. So the document service card will have a mechanism for metered billing. Metered billing will typically involve collection of use information which is then billed based on some use rate. Alternatively, the document service card may have a "fee credit" which would be given at time of "purchase" but which would have to be updated when the credit is exhausted. Further, the document service card may have various mechanism for enabling use of the card contingent on predetermined criteria (e.g. billed fees have been paid).

It should also be noted that fees may be metered by the document processing platform via the service card communication protocol as described below.

The currently preferred embodiment of a document service card is embodied in a PC card in accordance with at least PCMCIA Type III or IV standards. PCMCIA Type III or IV compliant cards are 85.6 millimeters long, 54 millimeters wide and have a thickness of 5.0 or 10.5 millimeters, respectively. This small size makes document service cards easily transportable.

Service Card Protocol

A document processing platform interacts with a document service card according to a service card protocol. The service card protocol is a communications protocol which define the manner in which: 1) the service card and document processing system establish a trusted session, 2) services are registered, media control (such as selection of paper stock or toners), and 3) the reading and writing of page images between the document processing system and the service card. The Service Card Protocol may also support service card usage fee reporting and invocation of image processing hardware accessible to card-mounted systems and programs.

The establishment of a trusted session is meant to create a session that is reasonably safe from intrusion and that the respective devices have established themselves as bona fide (i.e. not an intruder). The initiation of the registration process is automatic and is triggered by the establishment of the electrical connection between the service card and the document processing system. The steps for establishment of a trusted session include identity verification and login procedures. For a more robust description of establishment of trusted sessions between devices see U.S. patent application, Ser. No. 08/344,042, Stefik, et al. entitled "System For Controlling the Distribution and Use of Digital Works", which is assigned to the assignee of the present invention.

Service registration is triggered automatically by the insertion of a service card into the document processing platform, and deregistration is triggered by removal of a document service card. As noted above, registration of a service is the process in which the corresponding service class in the service taxonomy is marked as available and a pointer to the location of the instruction comprising the service is inserted. In the registration process, any constraints or prerequisites for a service (e.g. any collateral services needed) are also identified. The deregistration of a service is merely the marking of a corresponding service class as unavailable. It should be noted that the act of deregistration need not be triggered by the act of removing the service card from the document processing system. As the instructions and processing related with the service class remain in the service card, any attempt to perform that instruction absent the needed service card could cause the deregistration to be performed.

The reading and writing of page images is a file exchange using a file transfer protocol.

Fee reporting is the mechanism by which billing for the use of a service is performed. This can be done by incorporation of a credit or billing server contained in the document processing system, or by the counting of "clicks" which are reported to the document processing system (a click representing a use of a service or particular instruction).

Control Forms

Figure 9:
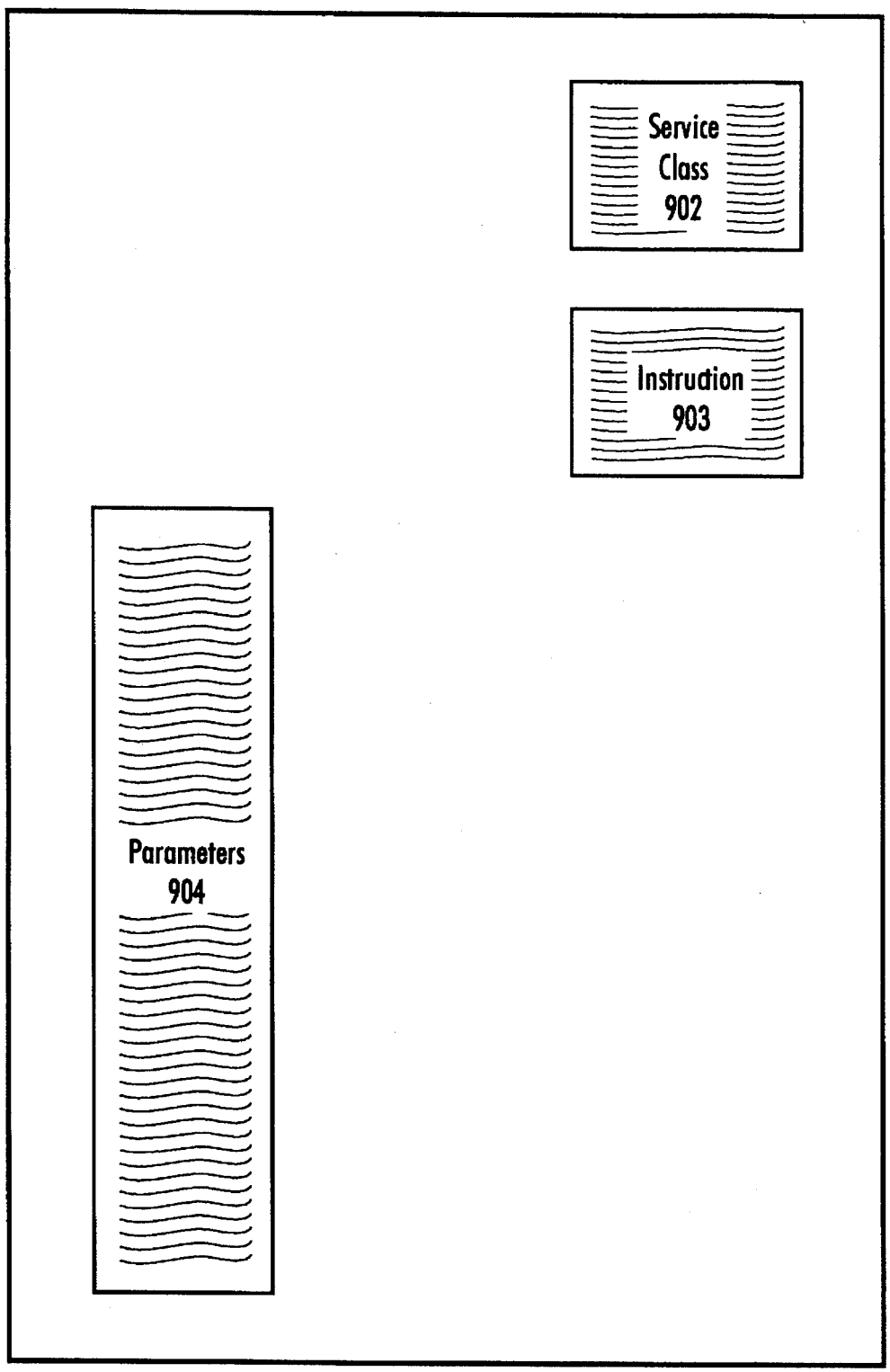
FIG. 9 is an illustration of a control form as may be utilized with a document input stream to invoke services, in the currently preferred embodiment of the present invention.

The use of control forms to provide processing instructions for a digital copier is described in U.S. Pat. No. 4,757,348, entitled "High Speed Electronic Reprographic/Printing Machine", which is also assigned to the assignee of the present invention. A suitable form type that may be used in the present invention is described in U.S. Pat. No. 5,060,980, entitled "Form Utilizing Encoded Indications For Form Field Processing", which is assigned to the assignee of the present invention. The control form of the currently preferred embodiment is illustrated in FIG. 9. Referring to FIG. 9, a control form 901 has located at predetermined locations a service class area 902, an instruction area 903 and a parameters area 904. The service class area 902 defines the general class of services for the instruction. This information will enable the service dispatcher to readily identify the best service for processing the instruction from the service taxonomy. The instruction area 903 contains the actual document processing instruction. The parameters area 904 contains various processing parameters for the service to be performed.

It should be noted that control form of FIG. 9 can be either marks on paper, or it can be an electronic representation of marks on paper (i.e. a bit mapped representation of the marks on paper). In the first instance, the input document stream will have come from an input scanner coupled directly to the document processing instance. In the second instance, the input document scream may have been received over a network or through a facsimile transmission.

Finally, other types of control forms for controlling operation of the document processing system are possible. Noted above was the use of control sheets to modify the operation of the service dispatcher and to "turnoff" services. It is anticipated that control forms may be used to completely control the operation of the document processing system.

Thus, an extensible document processing system is disclosed. While the present invention is described with respect to a preferred embodiment, it would be apparent to one skilled in the art to practice the present invention with other configurations of document processing systems. Such alternative embodiments would not cause departure from the spirit and scope of the present invention.

What is claimed:

1. An extensible document processing arrangement comprising:

one or more document service cards each indicating one or more document services;

a document processing platform for creating a document output from a document input stream, said document processing platform comprising:

one or more slots, each of said one or more slots for receiving a document service card;

service registration means for marking document services as available in a service taxonomy responsive to detection of a document service card being received by one of said one or more slots;

service deregistration means for marking document services as unavailable in said service taxonomy;

input means for receiving a document input stream representing a document to be processed and control forms;

means for detecting and extracting control forms contained in said input stream;

a service dispatcher for receiving an instance of a control form and selecting a document service in said service taxonomy to process said instance of said control form; and output generation means for reproducing said document input stream responsive to said selected document service.

2. The extensible document processing arrangement as recited in claim 1 wherein said document input stream is comprised of one or more pages on a medium and said control form is encoded on said pages.

3. The extensible document processing arrangement as recited in claim 2 wherein said input means is further comprised of a scanner for creating bit-mapped representations of pages in said document input stream.

4. The extensible document processing arrangement as recited in claim 1 wherein said service taxonomy is comprised of a plurality of hierarchically organized service classes stored on a service taxonomy storage medium.

5. The extensible document processing arrangement as recited in claim 4 wherein an instance of a service is comprised of a service class and the contents of all ancestor service classes.

6. The extensible document processing arrangement as recited in claim 4 wherein said control form is comprised of a service class identifier and an instruction, and said service dispatcher further comprises a means for identifying a default service class if said service class of said control form is not marked as available.

7. The extensible document processing arrangement as recited in claim 1 wherein a document service card is further comprised of a first storage means for storing documentation relating to the document processing services contained therein.

8. The extensible document processing arrangement as recited in claim 7 wherein said first storage means of said document service card is further for storing reproducible representations of control forms for invoking said document services.

9. The extensible document processing arrangement as recited in claim 8 wherein said document service card is further comprised of a second storage means for storing coded instructions for causing said document processing platform to carry out an associated document processing instruction.

10. The extensible document processing arrangement as recited in claim 8 wherein said document service card is further comprised of circuitry for carrying out a document processing instruction.

11. The extensible document processing arrangement as recited in claim 1 wherein said document service card is further comprised of means for metering fees for use of document processing services associated with said document service card.

12. A document processing system comprising:

a document processing platform for creating an output medium from an input medium, said document processing platform having means for performing a set of basic document processing services;

a document service card for providing document processing services to said document processing platform, said document service card comprising one or more document processing services and a connection means for coupling to said document processing platform; and a control form for causing a document processing instruction to be performed, said control form comprising a first area for encoding said instruction and a second area for encoding a service class for said instruction;

said document processing platform further comprising:
  a scanner for creating a bit-mapped representation of an input medium;
  an output generation means for writing to an output medium;
  a control form detection means coupled to said scanner, said control form detection means for detecting when an input medium is a control form;
  decoding means for decoding said instruction and service class from said control form;
  a service storage means for storing a service taxonomy of document processing services;
  a service dispatcher coupled to said decoding means and said service storage means, said service dispatcher for determining the most specialized document processing service for controlling said output medium generation means;
  coupling means for removably coupling said service card with said document processing platform; and
  service registration means for registering services from said service card into said service taxonomy when said service card is coupled to said coupling means, and for deregistering services from said service card when said service card is decoupled from said coupling means.

13. The document processing system as recited in claim 12 wherein said output generation means is a printing system.

14. The document processing system as recited in claim 12 wherein said output generation means is an image copying system.

15. A method for controlling the processing of an input document to create an output document on a document processing system, said document processing system having a basic set of document processing services and said input document comprising control form sheets and raw sheets, said method comprising the steps of:

a) placing said document processing system in a default document processing configuration;

for each sheet of said input document b) scanning said sheet;

c) determining if said scanned sheet is a control form or a raw sheet;

d) if said scanned sheet is a raw sheet, processing said raw sheet according to a current processing configuration of said document processing system; and e) if said scanned sheet is a control form, identifying a service class for processing said control form;

f) placing said document processing system in a modified document processing configuration according to instructions in said identified service class; and g) processing raw sheets according to said modified document processing configuration.

16. The method as recited in claim 15 wherein said step of determining if said scanned sheet is a control form or a raw sheet is further comprised of the steps of:

c1) examining a predetermined area of said scanned sheet to determine the presence of a control form indicator;

c2) if said control form indicator is present, identifying said scanned sheet as a control form; and c3) if said control form indicator is not present, identifying said scanned sheet as a raw sheet.

17. The method as recited in claim 16 wherein said step of if said scanned sheet is a control form, identifying a service class for processing said control form is further comprised of the steps of:

e1) extracting a service class indicator from said control form;

e2) identifying a service class from said service class indicator;

e3) checking a service taxonomy to see if said service class is available on said document processing system;

e4) if said service class is available, identifying said service class for processing said control form; and e5) if said service class is not available, identifying a superclass of said service class processing said control form.

18. The method as recited in claim 17 wherein said step of placing said document processing system in a modified document processing configuration according to instructions in said identified service class is further comprised of the steps of:

f1) extracting an instruction indicator from said control form;

f2) identifying an instruction from said instruction indicator; and f3) modifying said document processing configuration to perform said instruction on subsequent raw sheets.

19. The method as recited in claim 15 wherein prior to said step of placing said document processing system in a default document processing configuration performing the steps of:

providing a plurality of added document processing services to said document processing platform; and registering said added document processing services onto said document processing platform.

20. The method as recited in claim 19 wherein said step of registering said added document processing services as available is further comprised of the steps of:

for each of said added document processing services
locating a service class corresponding to said added document processing service in a service taxonomy; and
marking said document service class in said service taxonomy as available.

21. A transportable device for providing services to a document processing platform, said document processing platform having a plurality of slots for coupling with said transportable device, said transportable device comprising:

a first storage means for storing one or more document processing services;

a second storage means for storing control forms which may be printed by said document processing platform, said control forms for causing provided document processing services to be performed by said document processing platform;

a controller for controlling access to and transfer of information from said first and second storage means and said document processing platform; and coupling means for coupling said transportable device to said document processing platform.

22. The transportable device as recited in claim 21 wherein said first and second storage means are solid state memories.

23. The transportable device as recited in claim 21 further comprising metering means for generating fee information for use of document processing services of said transportable storage device.

* * * * *